이미지 참조:

United States Patent
Yamada

[11] Patent Number: 5,913,076
[45] Date of Patent: Jun. 15, 1999

[54] SIMPLE DATA INPUT DEVICE FOR SUPPLYING COMPUTER UNIT DIGITAL SIGNAL CONVERTED FROM ANALOG SIGNAL

[75] Inventor: Keizo Yamada, Tokyo, Japan

[73] Assignee: Nec Corporation, Tokyo, Japan

[21] Appl. No.: 08/826,053

[22] Filed: Mar. 28, 1997

[30] Foreign Application Priority Data

Mar. 29, 1996 [JP] Japan .................................. 8-077611

[51] Int. Cl.⁶ .................................................. A63F 9/00
[52] U.S. Cl. .......................................... 395/889; 395/893
[58] Field of Search ........................ 273/148 B; 363/17, 363/41; 324/77 R; 179/2 E; 307/106; 332/11 D; 395/893, 500, 882, 559

[56] References Cited

U.S. PATENT DOCUMENTS

| | | | |
|---|---|---|---|
| 4,041,386 | 8/1977 | Thomas et al. | 324/77 R |
| 4,087,638 | 5/1978 | Hayes et al. | 179/2 E |
| 4,542,354 | 9/1985 | Robinton et al. | 332/11 D |
| 4,746,810 | 5/1988 | Takahashi | 307/106 |
| 5,309,345 | 5/1994 | Nakamura et al. | 363/41 |
| 5,613,137 | 3/1997 | Bertram et al. | 395/800 |
| 5,625,539 | 4/1997 | Nakata et al. | 363/17 |
| 5,749,577 | 5/1998 | Couch et al. | 273/148 B |

FOREIGN PATENT DOCUMENTS

| | | |
|---|---|---|
| 2-96826 | 4/1990 | Japan . |
| 3-44726 | 2/1991 | Japan . |

*Primary Examiner*—Hassan Kizou
*Assistant Examiner*—Omar A. Omar
*Attorney, Agent, or Firm*—Foley & Lardner

[57] ABSTRACT

A house is two-dimensionally moved, and generates first and second analog signals representative of a movement in opposing first and second directions and another movement in opposing third and fourth directions that are perpendicular to the first and second directions. A data input device compares the first and second analog signals with a periodically changing reference signal to output a first pulse signal and a second pulse signal depending upon the comparison result, and selectively transfers a first pulse train and a second pulse train depending upon the duty factors of the first and second pulse signals so as to generate a composite digital signal representative of the motion of the mouse to a computer unit.

20 Claims, 7 Drawing Sheets

SIMPLE DATA INPUT DEVICE FOR SUPPLYING COMPUTER UNIT DIGITAL SIGNAL CONVERTED FROM ANALOG SIGNAL

FIELD OF THE INVENTION

This invention relates to a data input device of a computer system and, more particularly, to a data input device for supplying a computer unit a digital data signal converted from an analog signal.

DESCRIPTION OF THE RELATED ART

A host computer unit usually has input-and-output ports, and communicates with peripheral units through the input/output ports. Various digital data signals are supplied from the peripheral units such as a keyboard and a mouse to the input ports in either serial or parallel manner. A general-purpose serial data input port such as RS232C is installed in the host computer unit, and the host computer unit accepts serial digital data signals through the serial data input port.

There are peripheral units which originate data signals in the analog form, and a digitizer or a joystick processes such an analog data signal. When a piece of data information is supplied to the host computer unit through an analog data signal, the analog value is converted to a digital value before reaching the input port of a host computer unit, and the analog-to-digital conversion is usually carried out by using an analog-to-digital converter. Various analog signal input devices have been proposed, and the analog signal input device is equipped with the analog-to-digital converter.

In order to accurately convert an analog value to a digital value, the analog signal is expected to swing the potential level within an optimum potential range, and the optimum potential range is peculiar to each kind of the analog-to-digital converter. If an analog signal swings the potential level under the optimum potential range, the analog signal is amplified before the analog-to-digital conversion.

An analog-to-digital converter can convert an analog signal to a series of digital signals at high speed. Such a high-speed analog-to-digital converter converts an analog data signal at hundreds MHz to a series of 10-bit digital signals.

Figure 1:
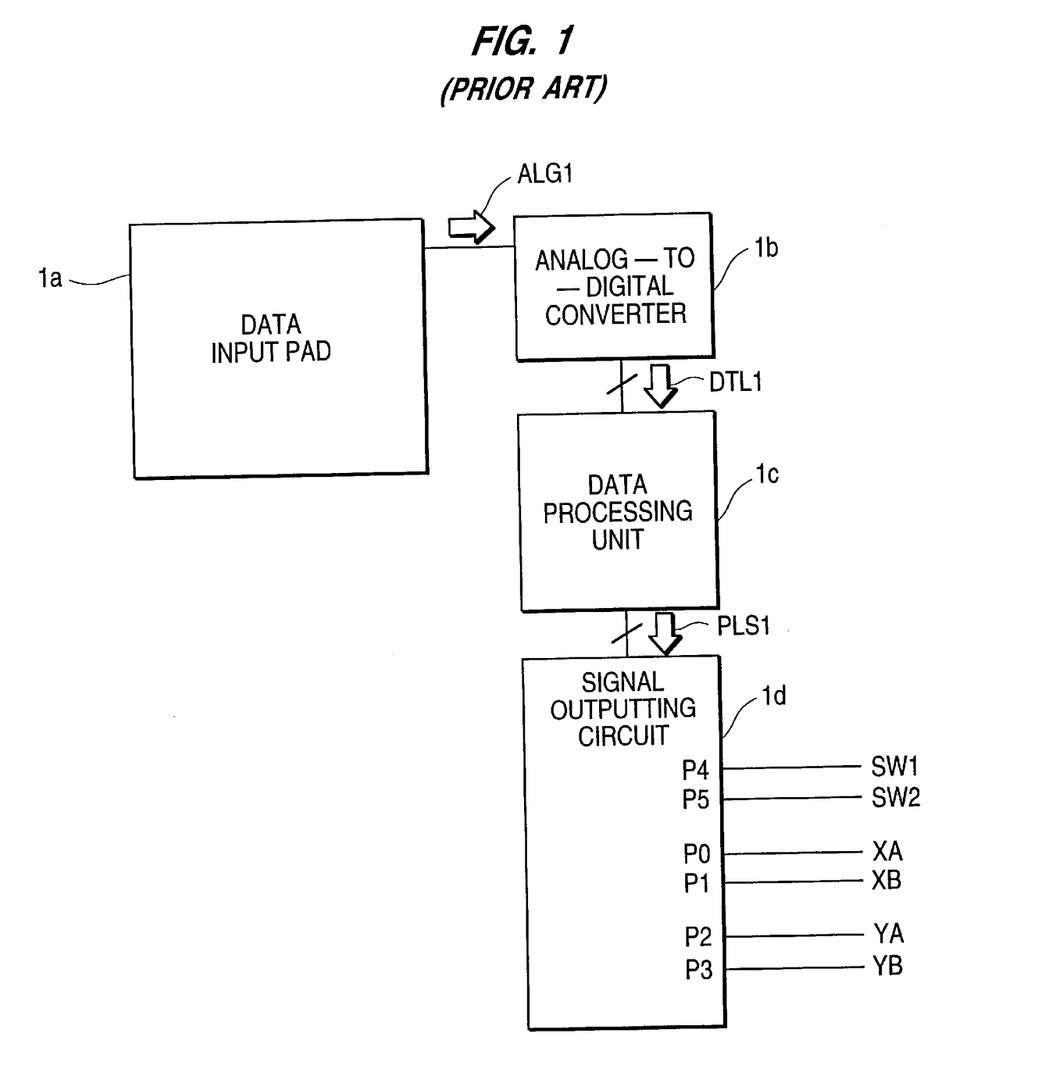
FIG. 1 is a block diagram showing the arrangement of the prior art bus mouse interface digitizer disclosed in Japanese Patent Publication of Unexamined Application No. 3-44726.

FIG. 1 illustrates a prior art data input device called a "bus mouse interface digitizer" disclosed in Japanese Patent Publication of Unexamined Application No. 2-96826. The bus mouse interface digitizer comprises a data input pad 1a, an analog-to-digital converter 1b connected to the data input pad 1a, a data processing unit 1c connected to the analog-to-digital converter 1b and a signal outputting circuit 1d connected to the data processing unit 1c.

The data input pad 1a defines a two-dimensional coordinate plane, and generates an analog data signal representative of a position on the two-dimensional coordinate plane. When a user specifies a point on the data input pad with a stylus, the data input pad 1a determines the specified point, and supplies the analog data signal ALG1 representative of the coordinates of the specified point to the analog-to-digital converter 1b.

The analog-to-digital converter 1b converts the analog value represented by the analog data signal ALG1 to a digital value, and generates a digital data signal DTL1 representative of the digital value. The analog-to-digital converter 1b supplies the digital data signal DTL1 to the data processing unit 1c.

The data processing unit 1c is responsive to the digital data signal DTL1 so as to determine an even number of pulses corresponding to the digital value, and supplies a pulse train PLS1 consisting of the even number of pulses to the signal outputting circuit 1d.

The signal outputting circuit 1d is responsive to controlling signals such as a control signal indicative of a read timing so as to supply a plurality of bytes of digital data signal to a mouse port of a host computer. Thus, the prior art bus mouse interface digitizer communicates with the host computer through the mouse port instead of the serial input port such as RS232C.

Figure 2:
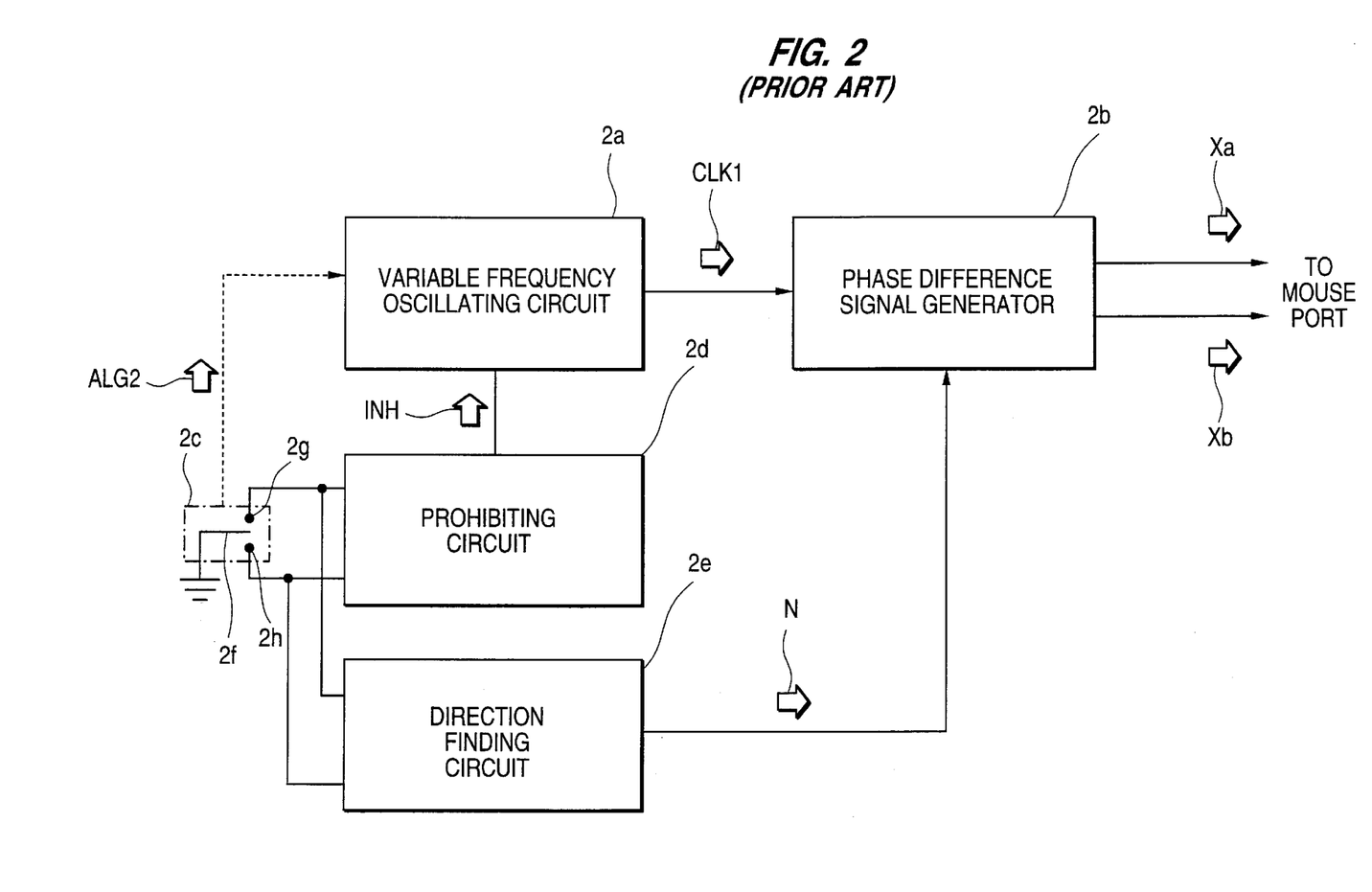
FIG. 2 is a block diagram showing the arrangement of the prior art data input device disclosed in Japanese Patent Publication of Unexamined Application No. 2-96826.

Another prior art data input device is disclosed in Japanese Patent Publication of Unexamined Application No. 2-96826. The prior art data input device supplies a digital data signal to a mouse port of a host computer unit, and the arrangement is illustrated in FIG. 2.

The prior art data input device comprises a variable frequency oscillator 2a, a phase difference signal generator 2b connected to the variable frequency oscillator 2a, a joystick 2c, a prohibiting circuit 2d connected to the joystick 2c and the variable frequency oscillating circuit 2a and a direction finding circuit 2e connected to the joystick 2c and the phase difference signal generator 2b.

The joystick 2c generates an analog data signal ALG2 representative of a tilt angle of the stick, and supplies the analog data signal ALG2 to the variable frequency oscillating circuit 2a. The variable frequency oscillating circuit 2a generates a clock signal CLK1 at a certain frequency corresponding to the analog value of the analog data signal ALG2. The clock signal CLK1 is supplied from the variable frequency oscillating circuit 2a to the phase difference signal generator 2b, and the phase difference signal generator 2b generates coordinate controlling signals Xa/Xb from the clock signal CLK1.

A moving contact 2f and fixed contacts 2g/2h are incorporated in the joystick 2c, and the moving contact 2g is grounded. If the tilt angle is positive, the moving contact 2f is brought into contact with the fixed contact 2g. On the other hand, if the tilt angle is negative, the moving contact 2f is brought into contact with the fixed contact 2h. When the tilt angle is within several angles, the prohibiting circuit 2d supplies a prohibiting signal INH to the variable frequency oscillating circuit 2a, and the variable frequency oscillating circuit 2a stops the clock signal CLK1.

The direction finding circuit 2e determines the direction in which the stick declines. The direction finding circuit 2e generates a control signal N representative of the direction, and the control signal N is supplied to the phase difference signal generator 2b. The phase difference signal generator 2b controls the relative phase between the coordinate controlling signals Xa and Xb. The coordinate controlling signals Xa/Xb are supplied to a mouse port of a personal computer (not shown).

The personal computer is responsive to the coordinate controlling signals Xa/Xb for moving a cursor on a screen of a display unit. The prohibiting circuit 2d does not allow the cursor to be widely moved on the basis of a short movement of the stick.

Thus, the prior art data input devices produce the digital signals from analog signals, and the digital signals are supplied through the mouse ports to the host/personal computers. However, the prior art data input devices encounter a problem in the complicated arrangement, and are, accordingly, so expensive. In detail, the prior art bus mouse interface digitizer requires the data processing unit 1c for calculating an even number of pulses. The data processing unit 1c is complicated and expensive. For this reason, the prior art bus mouse interface digitizer is complicated and expensive.

On the other hand, the prohibiting circuit 2d and the direction finding circuit 2e are incorporated in the prior art data input device shown in FIG. 2, and make the arrangement of the prior art data input device complicated and expensive.

A personal computer system is getting popular and popular, and is manipulated by family members. In this situation, data information tends to be originated by the family members in the analog form, and there is a great demand on an easily manipulative man-machine interface for converting an analog value to a corresponding digital value.

SUMMARY OF THE INVENTION

It is therefore an important object of the present invention to provide a data input device which is simple and inexpensive for supplying a computer unit a digital data signal converted from an analog signal.

In accordance with the present invention, there is provided a data input device for supplying a digital data signal to a data input port of a computer unit assigned to a mouse, the data input device comprises a modulating section supplied with at least a first analog signal representative of a movement in a first direction or a second direction opposite to the first direction and comparing the first analog signal with a reference signal periodically changing a potential level thereof so as to change a duty factor of a first pulse signal representative of the movement, a pulse train generating section producing a first pulse train representative of a movement in one direction and a second pulse train different in phase from the first pulse train and representative of the opposite direction to the one direction, and a selecting section including a first switching circuit responsive to the first pulse signal so as to selectively transfer the first pulse train and the second pulse train to an output sub-section connectable to the data input port depending upon the direction of the movement.

BRIEF DESCRIPTION OF THE DRAWINGS

The features and advantages of the data input device according to the present invention will be more clearly understood from the following description taken in conjunction with the accompanying drawings in which.

DESCRIPTION OF THE PREFERRED EMBODIMENT

Figure 3:
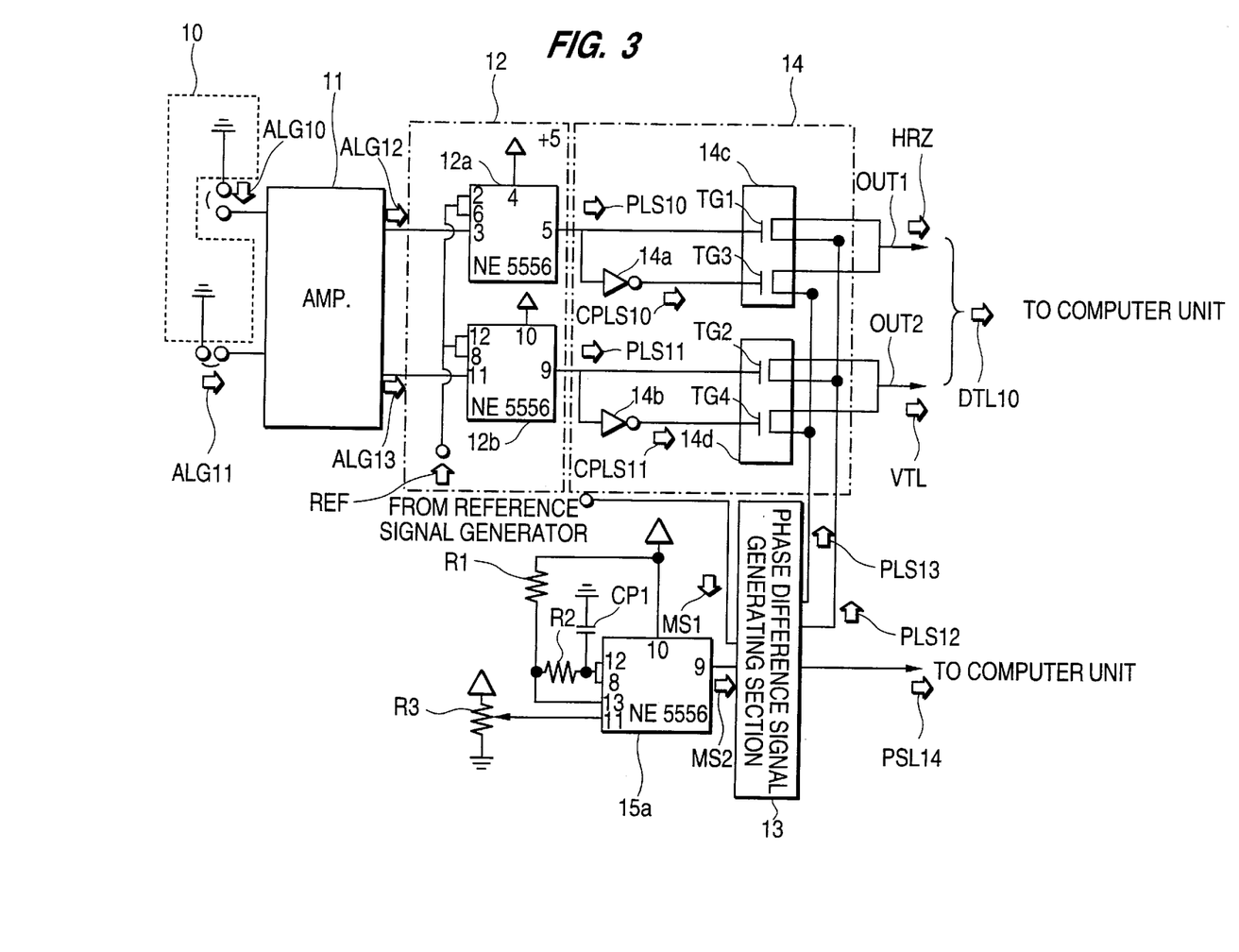
FIG. 3 is a block diagram showing the arrangement of a data input device according to the present invention.

Referring to FIG. 3 of the drawings, a data input device embodying the present invention is connected between a source 10 of analog signals ALG10/ALG11 and a data input port of a computer unit (not shown) assigned to a mouse (not shown), and produces a digital data signal DTL10 from the analog signals ALG10/ALG11. In this instance, the analog signal source 10 is a mouse, and the analog signals ALG10/ALG11 represent a movement of the mouse in one direction corresponding to a horizontal direction on a screen of a display unit (not shown) and another movement of the mouse in the other direction perpendicular to the one direction corresponding to a vertical direction on the screen, respectively. The data input device according to the present invention is available for another analog signal source such as, for example, a joystick. The analog signal source 10 may be a sensor for detecting a physical quantity such as acceleration, pressure, force, vibrations, displacement or flow velocity or a biosensor for detecting cardioelectric level, myoelectric level or brain wave.

A data input port assigned to a mouse usually accepts a digital data signal with three pulse trains. One of the pulse trains is indicative of a reference phase. The second pulse train is advanced with respect to the reference phase, and the third pulse train is delayed from the reference phase.

The data input device according to the present invention largely comprises an amplifying section 11 connected to the source of analog signal ALG10/ALG11, a modulating section 12 connected to the amplifying section 11, a phase difference signal generating section 13 and a selecting section connected to the modulating section 12 and the phase difference signal generating section 13.

The amplifying section 11 increases the magnitude of the analog signals ALG10/ALG11, and matches the potential range of the analog signals ALG10/ALG11 to the optimum potential range for the modulating section 12. The analog signals thus amplified are supplied to the modulating section 12, and are labeled with "ALG12" and "ALG13", respectively. If the analog signals ALG10/ALG11 originally swing the potential levels within the optimum potential range, the analog signal source may be directly connected to the modulating section.

Figure 4:
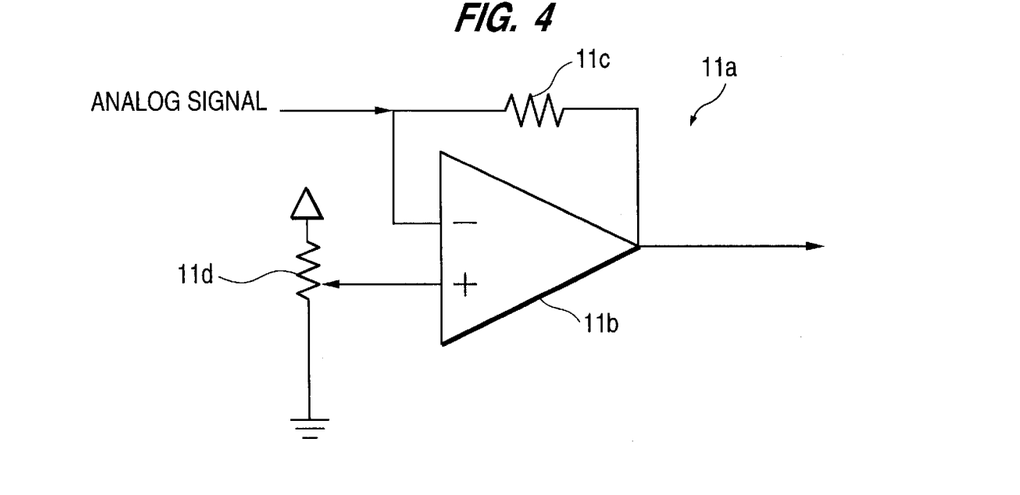
FIG. 4 is a circuit diagram showing an amplifier incorporated in an amplifying section of the data input device.

FIG. 4 illustrates an amplifier 11a incorporated in the amplifying section 11. The amplifier 11a includes an operational amplifier 11b, a feedback resistor 11c and a offset regulator 11d implemented by a variable resistor. The analog signal ALG10/ALG11 is supplied to the inverted node "−" of the operational amplifier 11b, and the output node is connected through the feedback resistor 11c to the inverted node "−". The variable resistor lid is connected between the positive power source and the ground line, and the non-inverted node "+" of the operational amplifier 11b is connected to the output node of the variable resistor 11d. The offset regulator removes an offset from the analog signal, and the operational amplifier 11b and the feedback resistor 11c amplifies the analog signal.

Figure 5:
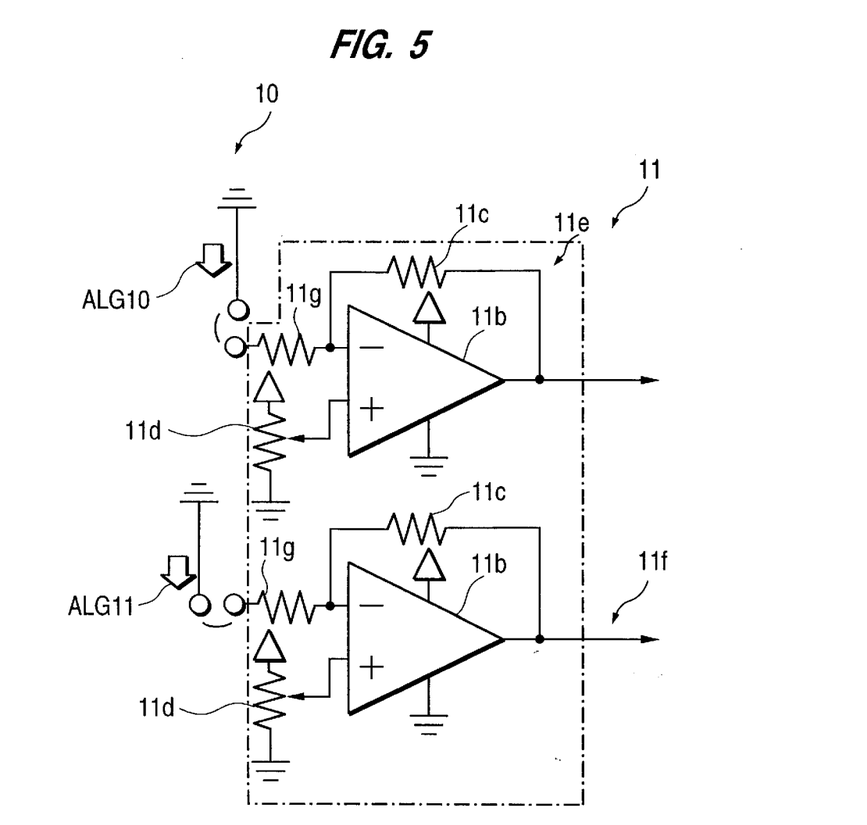
FIG. 5 is a circuit diagram showing the arrangement of the amplifying section of the data input device.

The analog signal source 10 supplies two analog signals ALG10/ALG11 to the amplifying section 11, and, for this reason, two amplifiers 11e and 11f form in combination the amplifying section 11 as show in FIG. 5. Although an input resistor 11g is connected between the analog signal source 10 and the inverted node "−" the circuit configuration of the amplifiers 11e/11f is similar to that of the amplifier 11a, and, for this reason, the circuit components are labeled with the same references designating corresponding components of the amplifier 11a without detailed description.

Turning back to FIG. 3, the modulating section 12 is responsive to the analog signals ALG12/ALG13 so as to change the duty factor of first and second pulse signals PLS10/PLS11 in response to the analog signals ALG12/ALG13. The modulating section 12 includes a first comparator 12a for the analog signal ALG12 and a second comparator 12b for the analog signal ALG13. A reference signal REF is supplied to first input nodes of the first and second comparators 12a/12b, and the analog signals ALG12/ALG13 are supplied to second input nodes of the first and second comparators 12a/12b, respectively. The reference signal REF has a symmetrical waveform between the positive side and the negative side with a gentle slope such as a triangular wave, a sine wave or a sawtooth wave.

The first and second comparators 12a/12b compares the analog signals ALG12/ALG13 with the reference signal REF, and generates the first and second square pulse signals PLS10/PLS11. The duty factor of the first square pulse signal PLS10 is varied with the analog signal ALG12, and the duty factor of the second square pulse signal PLS11 is varied with the analog signal ALG13. As described hereinbefore, the analog signals ALG12/ALG13 are representative of the movement in two directions perpendicular to each other, and, accordingly, the first and second pulse signals PLS10/PLS11 are representative of the two kinds of movement perpendicular to each other.

Figure 6:
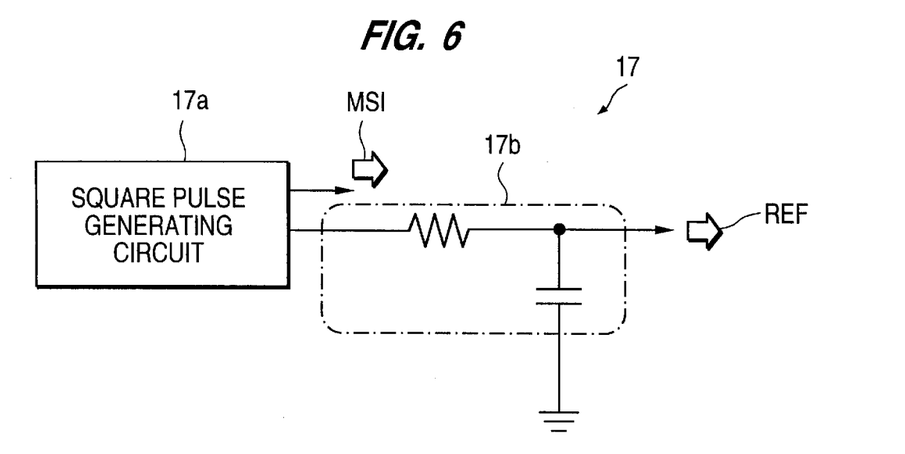
FIG. 6 is a circuit diagram showing the circuit configuration of a reference signal generator for a reference signal and a mouse clock signal.

The reference signal REF is supplied from a reference signal generator 17 to the modulating section 12, and the reference signal generator 17 includes a square pulse generating circuit 17a and a low-pass filter circuit 17b. See FIG. 6. The square pulse generating circuit 17a supplies square pulse train to the low-pass filter circuit 17b, and the square pulse train has the duty factor at 50 percent. The low-pass filter circuit 17b eliminates high-frequency components from the square pulse train, and produces a triangler pulse train from the square pulse train. The trianglar pulse train is supplied to the modulating section 12 as the reference signal REF. If the low-pass filter circuit 17b is arranged in such a manner as to eliminate higher-order frequency components, the low-pass filter circuit 17b supplies a sine wave signal to the modulating section 12 as the reference signal REF. The reference signal REF is not expected to have a strict triangular waveform or a strict sine waveform. Any periodic signal is available for the reference signal REF in so far as the periodic signal passes a reference potential level at the zero of the analog signal and the potential level is continuously changed for a certain time period. The square pulse generating circuit 17a may contain a quartz oscillator for producing the pulse clock signal MS1.

Turning back to FIG. 3 of the drawings, the phase difference signal generating section 13 produces first and second pulse trains PLS12/PLS13 on the basis of a mouse clock signal MS1 and a mouse shift signal MS2, and the first and second pulse trains PLS12/PLS13 are representative of movements in the directions opposite to each other. The mouse clock signal MS1 is usually used for controlling a mouse, and is directly supplied from the reference signal generator 17 to the phase difference signal generating section 13. The mouse shift signal MS2 is usually indicative of a direction of movement, and is supplied from a well-known operational amplifier 15a to the phase difference signal generating section 13.

A positive power voltage, which is represented by small triangle, is supplied to the tenth pin "10" of the operational amplifier 15a, and a resistor R1 is connected between the tenth pin "10" and the thirteenth pin "13". Another resistor R2 is connected between the resistor R1 and the eighth and twelfth pins "8" and "12", and a capacitor CP1 is connected between a ground line and the eighth and twelfth pins "8" and "12". The eleventh pin "11" is connected through a variable resistor R3 to the ground line. In this instance, the resistors R1, R2 and R3 are 10 kilo-ohms, and the capacitor CP1 is 0.1 micro-farad.

Figure 7:
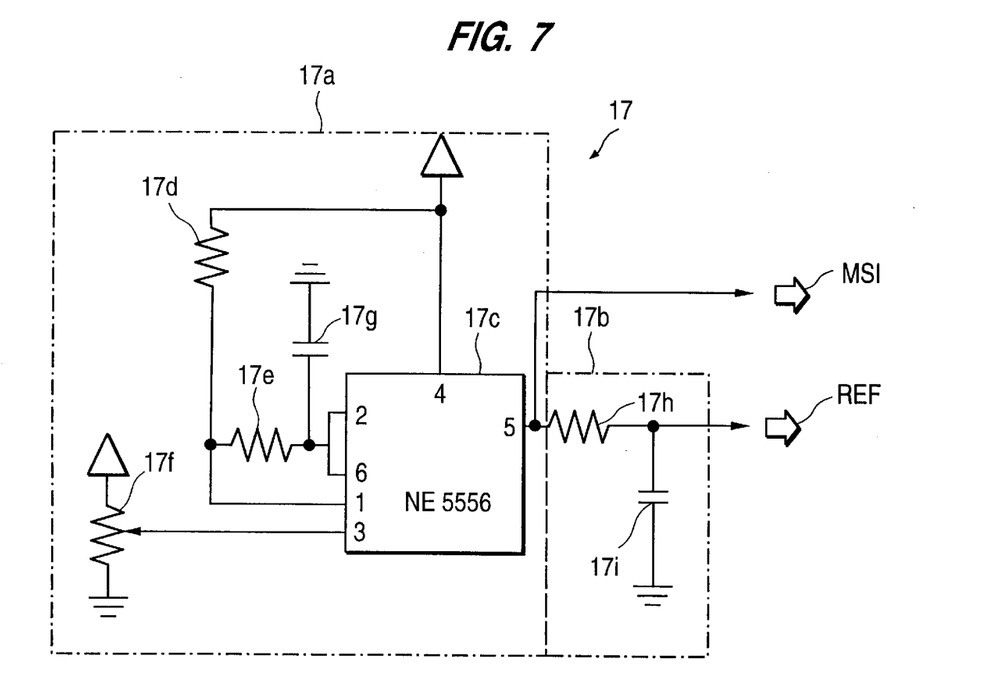
FIG. 7 is a circuit diagram showing, in detail, the circuit configuration of the reference signal generator.

FIG. 7 illustrates the circuit configuration of the reference signal generator 17. The square pulse generating circuit 17a includes an operational amplifier 17c, resistors 17d/17e, a variable resistor 17c and a capacitor 17g. The positive power voltage is supplied to the fourth pin "4" of the operational amplifier 17c, and the resistor 17d is connected between the fourth pin "4" and the first pin "1". The resistor 17e is connected between the resistor 17d and the second and sixth pins "2" and "6", and the capacitor 17g is connected between a ground line and the second and sixth pins "2" and "6". The variable resistor 17f is connected between the positive power source and the ground line, and the third pin "3" is connected to the output node of the variable resistor 17f. In this instance, the resistors 17d and 17e are 10 kilo-ohms, and the capacitor 17g is 0.1 micro-farad. The square pulse train takes place at the fifth pin "5" of the operational amplifier 17c, and is supplied to the phase difference signal generating section 13 as the mouse clock signal MS1.

The square pulse train is further supplied to the low-pass filter circuit 17b, and the low-pass filter circuit 17b is implemented by a time constant circuit with a resistor 17h and a capacitor 17i. In this instance, the resistor 17h is 10 kilo-ohms, and the capacitor 17i is 0.1 micro-farad.

Figure 8:
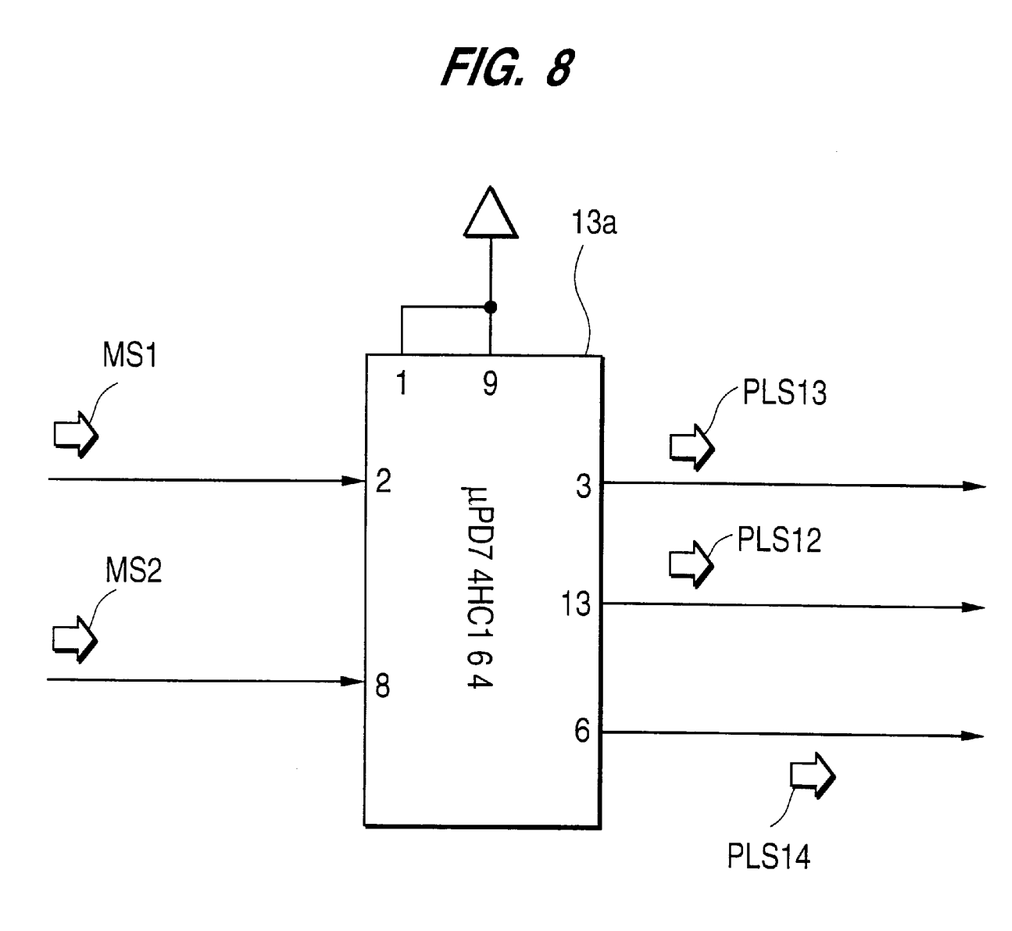
FIG. 8 is a view showing a phase shift oscillator serving as a phase difference signal generating section of the data input device.

The phase difference signal generating section 13 is implemented by a phase shift device 13a as shown in FIG. 8. The phase shift device 13a may be "muPD74HC164" known to a person skilled in the art. The second pin "2" is assigned to an input signal to be controlled, and the eighth pin "8" is assigned to a shift control signal. In this instance, the mouse clock signal MS1 and the mouse shift signal MS2 are respectively supplied to the second pin "2" and the eighth pin "8" of the phase shift device 13a, and, accordingly, the mouse clock signal MS1 is phase modulated with the mouse shift signal MS2.

The operational amplifier 17c (see FIG. 7) oscillates the mouse clock signal MS1 at 1 KHz, and the other operational amplifier 15a (see FIG. 3) oscillates the mouse shift signal MS2 at 40 KHz. The pulse interval of the mouse shift signal MS2 is at least a tenth of the pulse interval of the mouse clock signal MS1.

The phase shift device 13a is responsive to the mouse shift signal MS2 so as to introduce a time delay between the first pulse train PLS12 and the second pulse train PLS13. The first pulse train PLS12 is advanced with respect to an intermediate phase signal PLS14, and the second pulse train PLS13 is delayed with respect to the intermediate phase signal PLS14. The first pulse train PLS12 and the second pulse train PLS13 are output from the thirteenth pin "13" and the third pin "3", respectively.

The intermediate phase signal PLS14 serves as the pulse train indicative of the reference phase, and is supplied to the data input port assigned to the mouse. The direction of the movement is specified by introducing the phase difference to the mouse clock signal MS1.

Turning back to FIG. 3 of the drawings, the selecting section 14 includes first and second inverters 14a/14b and first and second switching circuits 14c/14d. The first and second inverters 14a/14b are respectively connected to the first and second comparators 12a/12b, and generates first and second complementary pulse signals CPLS10/CPLS11. Each of the first and second switching circuits 14c has two transfer transistors TG1/TG2 and TG3/TG4. The first pulse train PLS12 is supplied to the transfer transistors TG1/TG2, and the transfer transistors TG1/TG2 are respectively gated by the first and second pulse signals PLS10/PLS11. On the other hand, the second pulse train PLS13 is supplied to the transfer transistors TG3/TG4, and the transfer transistors TG3/TG4 are respectively gated by the first and second complementary pulse signals CPLS10/CPLS11. The output nodes of the transfer transistors TG1/TG3 are connected to a first output node OUT1, and the output nodes of the transfer transistors TG2/TG4 are connected to a second output node OUT2. Thus, the first and second switching circuits 14c/14d are gated by the first pulse signal/the first complementary pulse signal PLS10/CPLS10 and the second pulse signal/the second complementary pulse signal PLS11/CPLS11, respectively, and transfer one of the first and second pulse trains PLS12/PLS13 to the first output node OUT1 depending upon the potential levels of the first pulse signal/the first complementary pulse signal PLS10/CPLS10 and one of the first and second pulse trains PLS12/PLS13 to the second output node OUT2 depending upon the potential levels of the second pulse signal/the second complementary pulse signal PLS11/CPLS11. The digital data signal DTL10 is composed of the first pulse train/the second pulse train PLS12/PLS13 at the first and second output nodes OUT1/OUT2, and the digital data signal DTL10 is supplied to the data input port of the computer unit assigned to the mouse. The pulse train at the first output node OUT1 and the other pulse train at the second output node 0UT2 represent the movement of the mouse in one direction corresponding to the horizontal direction on the screen and the movement of the mouse in the other direction corresponding to the vertical direction on the screen, respectively, and are labeled with "HRZ" and "VTL", respectively.

In the above described embodiment, the phase difference signal generating section and the output nodes OUT1/OUT2 serve as a pulse train generating section and an output sub-section, respectively.

Subsequently, description is made on the behavior of the data input device according to the present invention with reference to FIG. 9. The mouse is rightwardly and leftwardly movable, and the rightward motion and the leftward motion are corresponding to the reciprocal motion of the cursor in the horizontal direction on the screen. The mouse is further reciprocally movable in the perpendicular direction to the rightward/leftward motions, and the reciprocal motion of the mouse is corresponding to the reciprocal motion of the cursor in the vertical direction on the screen. When the mouse is spaced from the user, the motion of the mouse is referred to as "upward motion". On the other hand, when the mouse becomes closer to the user, the motion of the mouse is hereinbelow called as "downward motion". The upward motion is opposite to the downward motion.

While a user is moving the mouse on a plane, a built-in acceleration sensor gently changes the analog signals ALG10/ALG11, and the amplifying section 11 supplies the analog signals ALG12/ALG13 corresponding to the analog signals ALG10/ALG11 to the modulating section 12. The rightward motion is represented by the analog signal ALG12 with a potential level higher than the reference level R, and the leftward motion is represented by the analog signal ALG12 with a potential level lower than the reference level R. On the other hand, the upward motion and the downward motion are represented by the analog signal ALG13 with a potential level higher than the reference level R and the analog signal ALG13 with a potential level lower than the reference level R, respectively, as shown in the first column in FIG. 9. The magnitude of the acceleration is represented by the amplitude of the analog signals ALG12/ALG13.

If the user obliquely moves the mouse, the oblique motion is decomposed into the rightward/leftward motion and the upward/downward motion, and the built-in accelerating sensor changes both of the analog signals ALG10/ALG11 and, accordingly, the analog signals ALG12/ALG13.

The first comparator 12a compares the analog signal ALG12 with the reference signal REF. While the reference signal REF is being lower in potential level than the analog signal ALG12, the first comparator keeps the first pulse signal PLS10 in a high level corresponding to logic "1". However, when the reference signal REF exceeds the analog signal ALG12, the first comparator 12a changes the first pulse signal PLS10 to zero or logic "0". Therefore, the rightward motion results in a large duty factor of the first pulse signal PLS10, and the leftward motion results in a small duty factor of the first pulse signal PLS10. Similarly, the upward motion and the downward motion result in a large duty factor of the second pulse signal PLS11 and a small duty factor of the second pulse signal PLS11 as shown in the second column in FIG. 9.

As described hereinbefore, the pulse trains HRZ and VTL stand for the rightward/leftward motions and the upward/downward motions, respectively. If the user rightwardly moves the mouse, the switching circuit 14c inserts the pulse train PLS12 into the pulse train PLS13 for a short time period as shown in the first row of the third column in FIG. 9. On the other hand, when the user leftwardly moves the mouse, the switching circuit 14c inserts the pulse train PLS13 into the pulse train PLS12 for a short time period as shown in the second row of the third column in FIG. 9.

Figure 9:
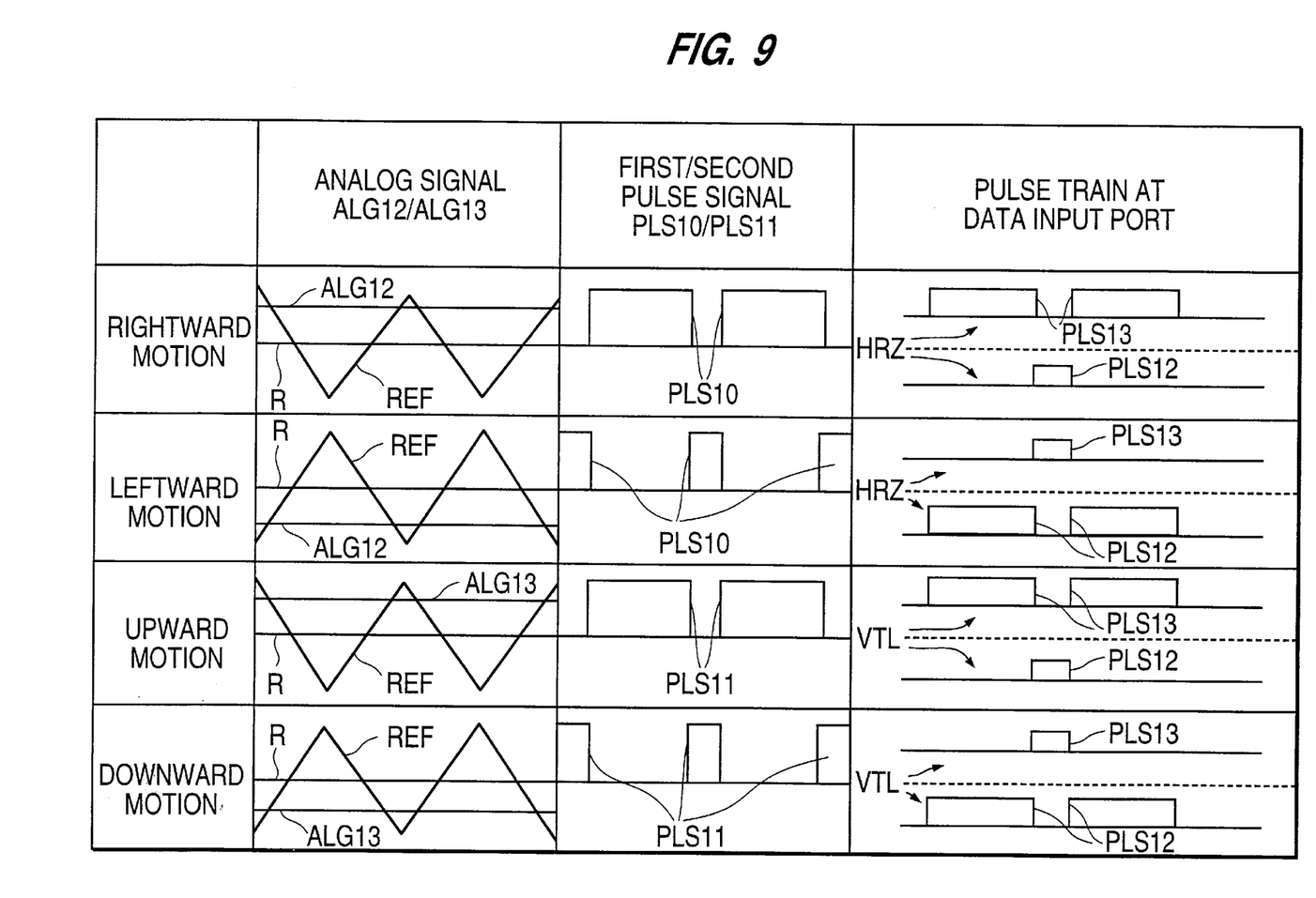
FIG. 9 is a view showing relation between analog signals, first and second pulse signals and the movement of a cursor on a screen of a display unit.

Similarly, when the user upwardly moves the mouse, the switching circuit 14d inserts the pulse train PLS12 into the pulse train PLS13 for a short time period as shown in the third row of the third column in FIG. 9. On the other hand, when the user downwardly moves the mouse, the switching circuit 14d inserts the pulse train PLS13 into the pulse train PLS12 for a short time period as shown in the fourth row of the third column in FIG. 9.

Thus, the pulse trains HRZ and VTL are phase modulated depending upon the motion of the mouse, and the phase modulated pulse trains HRZ/VTL are supplied to the data input port of the computer unit together with the reference pulse signal PLS14.

The computer unit compares the phase of the pulse train HRZ and the phase of the other pulse train VTL with the reference phase, and determines the motion of the cursor on the screen. The computer unit averages the ratio between the pulse trains PLS12 and PLS13, and determines the direction of mouse's motion. For this reason, it is possible for the computer unit to continuously monitor the motion of the mouse through the pulse trains HRZ/VTL.

The computer unit may supply the pieces of data information representative of the motion of the mouse through a graphic user interface (GUI) to a display unit so as to reproduce the motion of the mouse linked with a picture separately processed.

As will be appreciated from the foregoing description, the present invention achieves the following advantages.

First, the analog signals ALG10/ALG11 are converted to the phase-modulated pulse trains HRZ/VTL, and the phase-modulated pulse trains HRZ/VTL are supplied to the data input port assigned to the mouse. The pulse trains PLS12/

PLS13 produced from the quartz oscillating element are so stable that the phase-modulated pulse trains HRZ/VTL allow the computer unit to clearly discriminate a delicate motion of the mouse or another sensor. In case where the quartz oscillating element is used, the data input device is free from the undesirable interruption of oscillation frequently taken place in the voltage-controlled oscillator.

Second, the analog-to-digital conversion is carried out by the comparators 12a/12b, and the comparators 12a/12b are inexpensive and simple in circuit configuration. The data input device according to the present invention does not require an expensive analog-to-digital converter and an expensive voltage-controlled oscillator for the analog-to-digital conversion. This results in reduction of the production cost.

Third, the comparators 12a/12b are less sensitive to a temperature change rather than the voltage-controlled oscillator.

Although particular embodiments of the present invention have been shown and described, it will be obvious to those skilled in the art that various changes and modifications may be made without departing from the spirit and scope of the present invention.

For example, a temperature compensating element may be added to the variable resistor 11d in case where a temperature change widely changes the analog signals. The temperature compensating element may be further added to between a source of reference signal REF and the modifying section 12. The comparators 12a and 12b compare the analog signals ALG12/ALG13 and the reference signal REF, and the comparison result is relative. For this reason, if the temperature compensating element is added to one of the amplifying section and the modifying section, the temperature compensating element is effective against the drift. An offset may be too large in case of a kind of sensor, and it is recommendable to remove the offset from both.

The modulating section 12 and the selecting section 13 may have a single comparator and a single switching circuit so as to process a single analog signal representative of a linear motion.

If the modulating section 12 and the selecting section 13 may have three comparators and three switching circuits, the data input device can convert three analog signals representative of a three-dimensional motion to a digital data signal. The data signal may contain a piece of data information representative of a swinging motion of a pin ball.

What is claimed is:

1. A device connectable between an input device and a data input port of a computer unit, said device comprising:
   a modulating section supplied with at least a first analog signal representative of a first input from the input device, and comparing said first analog signal with a periodically changing reference signal to produce a first pulse signal representative of said first input;
   a pulse train generating section producing first and second pulse trains having different phases; and
   a first switching circuit selectively outputting, as a first output, said first pulse train and said second pulse train to said data input port depending upon a characteristic of the first pulse signal.

2. The device as set forth in claim 1, in which said modulating section is further supplied with a second analog signal representative of a second input from the input device, and compares said second analog signal with said periodically changing reference signal to produce a second pulse signal representative of said second input, and further comprising a second switching circuit selectively outputting, as a second output, said first pulse train and said second pulse train to said data input port depending upon a characteristic of the second pulse signal.

3. The device as set forth in claim 1, further comprising an amplifying section increasing a magnitude of said first input to produce said first analog signal.

4. The device as set forth in claim 3, in which said amplifying section includes an offset regulator which removes an offset voltage contained in said first input while said first input is amplified.

5. The device as set forth in claim 1, in which said reference signal has one of a triangular waveform, a sine waveform, and a sawtooth waveform.

6. The device as set forth in claim 2, further comprising an amplifying section increasing a magnitude of said second input to produce said second analog signal.

7. The device as set forth in claim 6, in which said amplifying section includes an offset regulator which removes an offset voltage contained in said second input while said second input is amplified.

8. The device as set forth in claim 1, wherein the characteristic of the first pulse signal comprises a duty factor that varies based on the comparison with the reference signal, and wherein the first switching circuit outputs the first pulse train when the duty factor is above a predetermined level, and outputs the second pulse train when the duty factor is below the predetermined level.

9. The device as set forth in claim 8, wherein the first input from the input device corresponds to a movement of the input device, and wherein the duty factor of the first pulse signal is above the predetermined level when the input device is moved in a first direction, and is below the predetermined level when the input device is moved in a second direction that is opposite the first direction.

10. The device as set forth in claim 2, wherein the characteristic of each of the first and second pulse signals comprises a duty factor that varies based on the comparison with the reference signal, and wherein the first switching circuit outputs the first pulse train when the duty factor of the first pulse signal is above a predetermined level, and outputs the second pulse train when the duty factor of the first pulse signal is below the predetermined level, and wherein the second switching circuit outputs the first pulse train when the duty factor of the second pulse signal is above the predetermined level, and outputs the second pulse train when the duty factor of the second pulse signal is below the predetermined level.

11. The device as set forth in claim 10, wherein the first and second inputs from the input device correspond to a movement of the input device.

12. The device as set forth in claim 11, wherein the duty factor of the first pulse signal is above the predetermined level when the input device is moved in a first direction, and is below the predetermined level when the input device is moved in a second direction that is opposite the first direction, and the duty factor of the second pulse signal is above the predetermined level when the input device is moved in a third direction that is perpendicular to the first direction, and is below the predetermined level when the input device is moved in a fourth direction that is opposite the third direction.

13. A circuit for receiving at least one analog input signal and producing at least one digital output signal to a data port of a computer, said circuit comprising:
   a pulse generator;
   a comparator having at least first and second inputs and at least one output, the first input connected to receive an analog signal representative of said analog input signal and the second input connected to receive a periodically changing reference signal; and a switching circuit, connected to the comparator and the pulse generator to receive the comparator output and at least first and second pulse trains from the pulse generator, for selectively outputting one of said first and second pulse trains as said digital output signal depending on the comparator output.

14. The circuit as set forth in claim 13, wherein the comparator output comprises a pulse train of low and high signals, the comparator generating one of the low and high signals when the analog signal is higher than the reference signal and the other one of the low and high signals when the analog signal is lower than the reference signal.

15. The circuit as set forth in claim 14, wherein the switching circuit is responsive to a duty factor of the comparator output so as to select between the first and second pulse trains.

16. The circuit as set forth in claim 15, wherein the switching circuit comprises first and second transistors, both of which are responsive to the duty factor of the comparator output, the first transistor being connected to receive the first pulse train for outputting the first pulse train when the duty factor of the comparator output is above a predetermined level, and the second transistor being connected to receive the second pulse train for outputting the second pulse train when the duty factor of the comparator output is below the predetermined level.

17. A method for producing at least one digital output signal from an analog input signal, comprising the steps of:

generating first and second pulse trains;

comparing said analog input signal with a periodically changing reference signal;

generating a third pulse train based on the result of the comparing step; and selecting between the first and second pulse trains as the digital output signal based upon a characteristic of the third pulse train.

18. The method as set forth in claim 17, wherein the step of generating the third pulse train includes the substeps of:

generating a high signal when the analog input signal is higher than the reference signal; and generating a low signal when the analog input signal is lower than the reference signal.

19. The method as set forth in claim 18, wherein the characteristic of the third pulse train comprises a duty factor.

20. A device for producing at least one digital output signal from an analog input signal, said device comprising:

means for generating first and second pulse trains;

means for comparing said analog input signal with a periodically changing reference signal;

means for generating a third pulse train having low and high signals, the high signals being generated when the analog input signal is higher than the reference signal and the low signals being generated when the analog input signal is lower than the reference signal; and means for selecting between the first and second pulse trains as the digital output signal based upon a duty factor of the third pulse train.

* * * * *